United States Patent Office 3,835,064
Patented Sept. 10, 1974

3,835,064
PROCESS FOR MANUFACTURING AN ACTIVATED CARBON
Takeshi Shinomiya, 6-2, 3-chome, Okuda; Yoshio Tarui, 8-10, 3-chome, Nakajima; and Shuhji Enomoto, 5-1, 1-chome, Shimoshinkita-machi, all of Toyama-shi, Toyama-ken, Japan
Filed Sept. 23, 1971, Ser. No. 183,087
Int. Cl. C01b 31/08
U.S. Cl. 252—423
3 Claims

ABSTRACT OF THE DISCLOSURE

This invention solves two problems in the manufacture of activated carbon by activation with chemicals, namely, (a) the corrosion of the equipment with the chemicals used, and (b) improving the recovery efficiency of the chemicals, as well as making it posible to use phosphoric acid on an industrial scale. This is accomplished by placing on the conveyer system a heated plate which moves with the conveyer system. On this plate is a film or sheet of a corrosion inhibiting organic substance, which is placed there to prevent corrosion and the waste of chemicals. Then, carbonaceous organic raw materials and activating chemicals are placed on said organic substance. The mixture is placed in a furnace and activated.

BACKGROUND OF THE INVENTION

The present invention relates to the production of activated carbon and more particularly to the production of activated carbon with increased recovery of activating chemicals and less corrosion of equipment.

BRIEF DISCUSSION OF THE PRIOR ART

Two methods are used in manufacturing activated carbon, the process of activation with chemicals and the process of activation with oxidizing gases. The present invention relates to a process for manufacturing activated carbon by activation with chemicals.

Processes for manufacturing activated carbon with chemicals have the following defects:
(I) Corrosion of the equipment with the chemicals used, and
(II) Difficulty of recovering the chemicals used.

The difficulty in recovering the chemicals used is due mainly to the following factors:
(a) Waste of chemicals while corroding the metal in the equipment.
(b) Vaporization of chemicals at high temperatures during heating.
(c) Waste of chemicals during extraction from heated raw activated carbon.

Among these three factors, in the case where phosphoric acid is used, is the amount of wasted chemicals because corrosion is much greater than that of the other factors, and the amount of waste because corrosion affects the recovery efficiency of the chemicals. Therefore, the preventing of corrosion of the equipment with chemicals greatly improves the recovery efficiency of the chemicals, however, conventional methods of corrosive prevention relate mostly to research for non-corrosive metals in the presence of phosphoric acid, and considerable sums of money have been spent for equipment using expensive non-corrosive alloys.

Chemicals having strong activation ability also have a strong corrosive action on metal, so that chemicals having a strong corrosive tendency which reduce the recovery efficiency are difficult to use industrially, so that at present the zinc chloride activation method is widely used.

In this method, zinc chloride and organic carbonaceous raw material are put into a rotary kiln or an enclosed furnace with an agitator, and heated at the temperature of from about 400° to about 800° C. Then hydrochloric acid is used to recover the zinc chloride. However, hydrochloric acid easily evaporates, particularly at high temperatures, and not only causes corrosion of equipment, but also exhausts harmful HCl gas into air, requiring expensive equipment to recover HCl gas and zinc sulfide for environmental pollution control.

Phosphoric acid, on the other hand, has a particularly good activation capability among activation agents and can produce high quality activated carbon at a temperature of 400° C. Furthermore, it is not always necessary to be recovered because there is only a small amount of phosphoric acid which evaporates.

On the other hand, phosphoric acid has a strong corrosive force, which prevents phosphoric acid from being used advantageously over zinc chloride on an industrial scale. Also, inexpensive corrosion prevention means have not been found in the conventional methods of manufacturing activated carbon, therefore the production of activated carbon industrially with phosphoric acid has not been widely carried out. The advantages of using phosphoric acid are as follows:

(1) It does not require hydrochloric acid to recover the chemicals.
(2) It can activate carbon at a comparatively low temperature of about 400° C., and the amount of evaporation is quite small.
(3) It is soluble in water and existing under dehydrating condensation conditions, to be recovered at a high concentration state by means of multistage extraction methods, the recovery efficiency is quite good without the necessity of concentration after repeated use. It is of superior activation ability i.e., a high quality activated carbon is produced.

OBJECTS OF THE INVENTION

The present invention provides a quite simple inexpensive and effective means for preventing corrosion with chemicals, which eliminates the foregoing defects when activation takes place with chemicals and makes it possible to use a strong acid for obtaining activated carbon industrially.

The principal object of this invention is to obtain activated carbon industrially and profitably, by using a third material at activation with chemicals to improve the recovery efficiency of chemicals and prevent the corrosion of the equipment by chemicals.

Another object of this invention is to raise the yield of activated carbon and not to waste manufacturing costs.

SUMMARY OF THE INVENTION

The principal feature of this invention is that phosphoric acid having a particularly strong corrosive effect and activation ability can also be used industrially with a third material available simply and inexpensively, and without the necessity of using hydrochloric acid for the recovery of the activation chemical materials, which contributes to improvement in the recovery efficiency of the activation chemical materials and raises the yield of high quality activated carbon.

Yet another feature of this invention is that the carbonaceous raw material, the activation chemical materials, and the third material is heated by means of a conveyer system.

BRIEF DESCRIPTION OF THE DRAWING

Other objects and advantages will become apparent from the following detailed description and accompanying drawing, in which.

DETAILED DESCRIPTION

As used herein, the term "activation chemical materials" includes boric acid, calcium hydroxide, calcium chloride, calcium phosphate, chlorine, cyanides, dolomite, ferric chloride, manganese chloride, manganese dioxide, manganese sulfate, nitric acid, phosphoric acid, potassium carbonate, potassium sulfide, potassium thiocyanate, sodium hydroxide, sodium phosphate, sodium sulfate, sulfur, sulfur dioxide, sulfuric acid and zinc chloride.

The term "carbonaceous materials" includes bagasse of sugar, blood and flesh residues, bones, cereals, coffee beans, coals, coconut shells, corncobs, cottonseed hulls, distillery waste, fish, fruit pits, kelp, lampblack, lignin, lignite molasses, nutshells, peat, petroleum acid sludge, petroleum coke, potassium ferrocyanide residues, pulp-mill waste, sawdust and wood.

By "third organic material" is meant an organic material substantially inert to the activation chemical materials.

On heated plate 1 which moves with the conveyer system, a third organic material 2 is placed. Above this third material are the organic raw materials 3 and the activation chemical materials of a predetermined thickness. These materials are introduced into a furnace and activated. The third material is put between heated plate 1 and activation chemical materials, together with carbonaceous organic materials, such as sawdust 3. This third material is an organic substance not including carbonaceous or activation materials to prevent the penetration of the activation chemical materials to plate 1, and preferably consist of a sheet film flour or granular of organic material.

The conditions required for the third material are as follows:

(1) It shall be relatively inert to the activating chemical materials, in other words, it shall not waste chemicals wih side reactions.

(2) It shall be an organic substance high in carbon content, that is, it is easily carbonized.

(3) The third material may be a heat resisting material which endures heat during the liquefied state of the components flowing from the organic raw materials, i.e., when the heated mixture is softened or liquefied temporarily and progressively solidified, and it must be heat resisting when the corrosive properties are high.

Third materials which satisfies these conditions are polyvinyl chloride, cellophane, paper, newspaper and the like, or wood flour or wood granules, such as sawdust not including activation chemical materials.

The following explanation relates to phosphoric acid which has the strongest activation ability and corrosive force.

Figure 1:
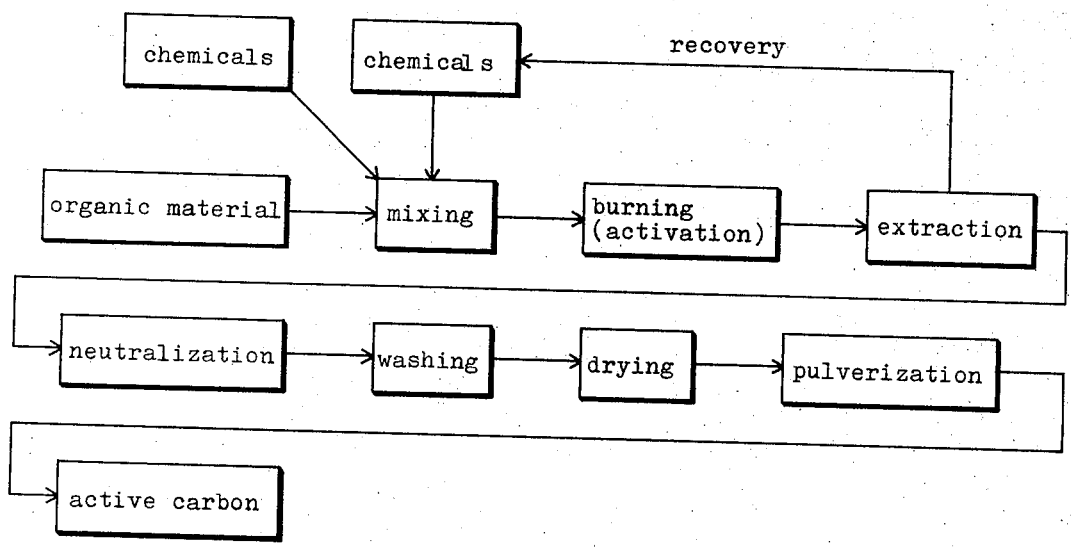
FIG. 1 is a flow process sheet for activated carbon according to the present invention.
Figure 2:
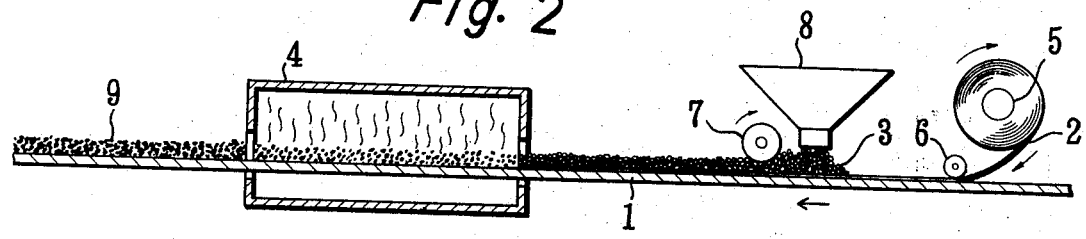
FIG. 2 is an outline profile showing the principal parts of the equipment used in carrying out this invention.

In FIG. 2, a third material, organic film 2 rolled at roll 5, is put on heated plate 1 moving at a suitable speed, through a guide roller 6, and is moved with the heated plate 1, said plate 1 need not be made of expensive alloy, but conventional iron plate may be used. Above heated plate 1, is provided a hopper 8 with stirring means (not shown in the figure), and pure phosphoric acid from 200 to 300 parts is added to dry wood flour 100 parts in said hopper 8, and stirred fully by mixer and the like, and wood flour including phosphoric acid 3 is fed from the mouth of hopper 8, pushed weakly by press roller 7 and formed at the thickness from 20 to 30 m./m., and sent to furnace 4, and heated and activated in an atmosphere of about 400° to 500° C. for about 15 to 30 minutes. During this process the raw materials and the phosphoric acid 3 are carbonized, and a third material such as film, sheet and the like, put between the raw carbonaceous material on plate 1. It is advantageous that old paper such as a newspaper be used for this third material in sheet form.

To coarse activated carbon 9 taken out of furnace 4, application of a multistage extraction treatment to the phosphoric acid condensated therein with water or hot water, can recover phosphoric acid having a concentration from 60% to 65%, which may be re-used for an activation material.

The coarse activated carbon extracted has a pH of from 3 to 4, and is neutralized by an alkaline solution, washed with water, adjusted to pH of from 6 to 8, and then by known means, dried, pulverized, and classified into fine activated carbon.

Figure 3:
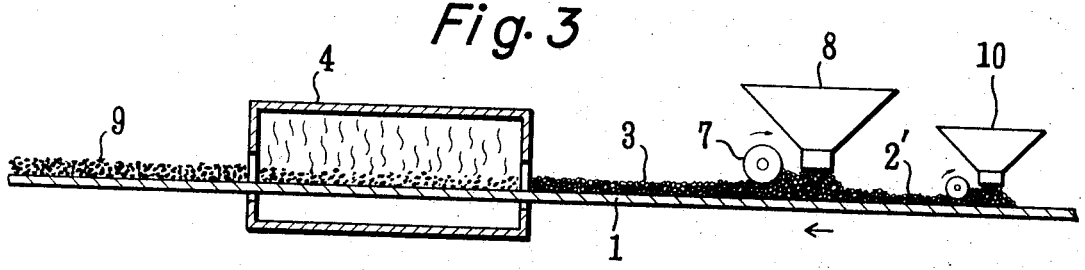
FIG. 3 is a similarly outline profile explaining features of the inventive concept.

In FIG. 3, dry wood flour 2' contained in hopper 10 is scattered in a thickness from 1 to 2 m./m. on heated plate 1. The organic powder, as a third material, is not restricted to wood flour, but everything which satisfies the above-mentioned conditions may be used.

The yield of fine activated carbon finally obtained by this method is from 45% to 55% and is improved by 10% as compared to the zinc chloride activation method. Phosphoric acid recovery efficiency is from 95% to 98%, and the surface area of the activated carbon is from 1200 to 1800 $m.^2/g.$, and deodorization, decoloration and other properties as activated carbon are satisfied. Moreover, a third material is not mixed with the product as dirt by carbonization, but can be used as a part of product, not to have bad influence on the quality of product.

The following illustrative examples show how phosphoric acid is used in progressively greater amounts from a laboratory scale to an industrial production scale under suitable conditions.

EXAMPLE I

Sawdust of silver fir about 70% and hemlock spruce about 30%, is dried one night in a dryer controlled at 105° C. Thus, a sample is made. To 100 parts sample, an 80% concentration of 312.5 parts of phosphoric acid, the theoretical amount being 250 parts, is added, stirred and caused to penetrate completely into the sample. 17.5 g. of sample is taken, thinly enveloped by a film or sheet of 14 x 17 $cm.^2$, shown in Table I, and softly pushed and reformed. When non-impregnated sawdust is used as the third material, 1.7 g. of that is scattered for said area. Then sawdust including phosphoric acid is formed on the third material. These samples are all put on a plate of stainless steel (SUS 27), and heated in an electric furnace at 450° C. for 3 to 4 minutes, to obtain raw activated carbon. The raw activated carbon obtained is put into a mortar and made into powder of 10 to 20 mesh. 1000 parts water is added per 100 parts of raw activated carbon, boiled and taken out, and filtrated to separate into washing solution and granule. After this operation is repeated three times, the extract is collected, and the amount of recovered phosphoric acid contained in it is titrated by caustic soda with methyl orange indicator. The percentage of amount of the recovered phosphoric acid to that of the amount added is the phosphoric acid recovery efficiency.

Washed activated carbon is dried one night in a dryer at 105° C., the percentage of weight of bone dry sawdust (supplied raw material) is the yield of activated carbon. As a material for comparison, sawdust including activation materials is formed directly on heated plate of stainless steel (SUS 27), and other carbonaceous materials are treated as hereinbefore described.

TABLE I

| Third material | Thickness (υ) | Weight (g.) per 14 x 17 $cm.^2$ |
|---|---|---|
| 1. Cellophane | 30 | 1.2 |
| 2. (Tracing paper) design sheet | 30 | 0.6 |
| 3. Paper | 40 | 0.6 |
| 4. Newspaper | 100 | 1.5 |
| 5. Sawdust | 1–2 m./m. | 1.7 |

Results

| Third material | Yield of activated carbon (percent) | Recovery efficiency of phosphoric acid (percent) | Surface area (m.²/g.) | Color of recovery solution |
|---|---|---|---|---|
| 1. None (material for comparison) | 47 | 90 | 1,400 | Blue. |
| 2. Cellophane | 51 | 96.5 | 1,350 | Colorless. |
| 3. (Tracing paper design sheet) | 49 | 95.5 | 1,500 | Do. |
| 4. Paper | 50 | 95 | 1,400 | Do. |
| 5. Newspaper | 54 | 96 | 1,300 | Do. |
| 6. Sawdust | 60 | 95 | 1,200 | Do. |

EXAMPLE II

The amounts of the components are varied. The size of the sheet, as compared with Example I, is changed to 12 x 15 cm.², and the amount of sawdust including phosphoric acid on it is varied. Several treatments are applied to each point, phosphoric acid recovery efficiency and surface area of activated carbon being measured, the relation of the surface area vs. phosphoric acid recovery efficiency, to surface area vs. treatment time is plotted, and phosphoric acid recovery efficiency and treatment time at surface area 1300 m.²/g. is obtained on the graph by means of interpolation. Other conditions are similar to Example I.

TABLE II

| Forming amount as sawdust (g.) per 12 cm. x 15 cm. | Recovery efficiency of phosphoric acid (percent) | Required treatment time (minute) |
|---|---|---|
| 5 | 96.6 | 2 |
| 10 | 96.2 | 5 |
| 15 | 96.2 | 6.6 |
| 20 | 95.9 | 10 |
| 30 | 95.6 | 12.5 |
| 40 | 96.2 | 17.5 |

EXAMPLE III

Treatment temperature and time are varied. To sawdust 100 parts (Bornean lauan) having a moisture rate of about 30%, exhausted from plywood plant, phosphoric acid solution 250 parts having phosphoric acid concentration 60% is added, stirred completely and formed on the sheet at the rate of 40 g. per 12 cm. x 15 cm., and treated in the electric furnace adjusted to various temperatures for suitable time. Other conditions are similar to Example I.

TABLE III

| Treatment temperature (° C.) | Treatment time (minutes) | Yield (percent) | Recovery efficiency of phosphoric acid (percent) | Surface area (m.²/g.) |
|---|---|---|---|---|
| 380 | 22 | 52.8 | 97.1 | 1,350 |
| 400 | 20 | 54.0 | 97.6 | 1,650 |
| 450 | 15 | 48.5 | 96.1 | 1,750 |
| 470 | 13 | 56.0 | 96.4 | 1,250 |
| 480 | 12 | 49.3 | 96.0 | 1,700 |
| 520 | 10 | 51.6 | 95.5 | 1,700 |

EXAMPLE IV

Testing at middle plant: Phosphoric acid 101 kg. having concentration of 62% is added to sample sawdust 25 kg. stirred with kneader, sheet is taken out of rolling machine to band type furnace of 1 m. width, put on the band, mixed sawdust including phosphoric acid is formed to 10 m.², heated in muffle furnace with oil burner at atmosphere of from 350° to 400° C. for a time period of 30 minutes, the raw activated carbon obtained is pulverized into 2 to 10 mm., extracted with dilute phosphoric acid solution and water at six stages and recovered. The results are as follows:

Yield of activated carbon, percent _____ 52.3
Recovery efficiency of phosphoric acid, percent ___ 96.0
Surface area, m²./g. _____ 1300

What is claimed is:

1. In the manufacturing of activated carbon wherein a carbon producing organic first material is placed on a plate together with an activating second material and said plate is then moved past a burning carbonizing zone wherein said materials react to produce an activated carbon, the improvement therein which comprises the following sequence of steps:
  (a) placing on said plate a layer of an organic third material of high carbon content and which is readily carbonized in said burning carbonizing zone, so disposed as to prevent said first and second materials from contacting the heated plate, said third material serving to prevent a reaction between said plate and said first and second materials wherein said third material is an organic material not yet carbonized which is selected from the group consisting of polyvinyl chloride, cellophane, paper, sawdust, wood flour, wood granule and mixtures thereof;
  (b) providing said first material in a powder or granular form and impregnating said powder or granular first material with phosphoric acid in a ratio of about 200 to 300 parts of phosphoric acid to 100 parts of first material;
  (c) placing said so impregnated first material on to said third material;
  (d) conveying said so placed and impregnated first material into a burning carbonizing zone and having said materials dwell in said zone for a time period of about 15 to about 30 minutes at a temperature of about 350° C. to about 520° C.;
  (e) recovering said phosphoric acid from the carbonized product using water; and
  (f) recovering said activated carbon product.

2. A process according to claim 1 wherein said third material is an organic film or sheet not yet carbonized.

3. A process according to claim 1 wherein said third material is an organic granule or flour not yet carbonized.

References Cited

UNITED STATES PATENTS

| 3,676,365 | 7/1972 | Shirai et al. | 252—423 |
| 1,610,399 | 12/1926 | Urbain | 252—422 |
| 1,287,592 | 12/1918 | Mumford | 252—423 |

FOREIGN PATENTS

| 5,007 | 6/1962 | Japan | 201—40 |

DANIEL E. WYMAN, Primary Examiner

P. E. KONOPKA, Assistant Examiner

U.S. Cl. X.R.

201—32; 252—422, 425